United States Patent [19]

Yoshinori et al.

[11] Patent Number: 4,834,221

[45] Date of Patent: May 30, 1989

[54] WHEEL ANGULAR ACCELERATION SENSOR FOR ANTI-LOCK CONTROLLER FOR VEHICLES

[75] Inventors: Yamanoi Yoshinori; Tsuchida Tetsuo, both of Saitama, Japan

[73] Assignee: Honda Giken Kogyo Kabushiki Kaisha, Tokyo, Japan

[21] Appl. No.: 127,223

[22] Filed: Dec. 1, 1987

[30] Foreign Application Priority Data

Dec. 4, 1986 [JP] Japan ............................. 61-289632
Dec. 9, 1986 [JP] Japan ............................. 61-293073

[51] Int. Cl.$^4$ .......................... B60T 8/34; B60T 8/46
[52] U.S. Cl. .............................. 188/181 A; 188/344; 303/113
[58] Field of Search ........... 188/181 A, 181 R, 181 T, 188/181 C, 344, 18 A, 180, 184–189; 303/113–119, 24.1; 192/13, 4 R, 12 R; 200/61.46

[56] References Cited

U.S. PATENT DOCUMENTS

| | | | |
|---|---|---|---|
| 4,660,683 | 4/1987 | Hayashi et al. | 303/113 X |
| 4,664,233 | 5/1987 | Tsuchida et al. | 188/181 A |
| 4,673,221 | 6/1987 | Hayashi et al. | 188/344 X |
| 4,694,938 | 9/1987 | Hayashi et al. | 188/181 A |
| 4,697,825 | 10/1987 | Hayashi et al. | 188/181 A X |
| 4,702,339 | 10/1987 | Hayashi et al. | 188/181 A X |
| 4,723,638 | 2/1988 | Tsuchida | 188/181 A |
| 4,733,757 | 3/1988 | Hayashi et al. | 188/181 A |
| 4,735,464 | 4/1988 | Tsuchida | 188/181 A X |
| 4,745,994 | 4/1988 | Tsuchida et al. | 188/181 A |
| 4,760,899 | 8/1988 | Hayashi et al. | 188/181 A |
| 4,766,982 | 8/1988 | Hayashi et al. | 188/181 A |
| 4,770,473 | 9/1988 | Tsuchida | 303/115 |

Primary Examiner—Douglas C. Butler
Attorney, Agent, or Firm—Lyon & Lyon

[57] ABSTRACT

In a wheel angular acceleration sensor for an anti-lock controller for sensing the locking tendency of a vehicle wheel being braked on the basis of overrunning and attendant axial displacement of a flywheel to produce a control signal for a braking force, the flywheel is connected through a clutch and a cam mechanism with an output shaft rotatable in accordance with rotation of the wheel, the cam mechanism being operable in response to overrunning of the flywheel to provide an axial displacement to the flywheel and comprising a drive cam plate supported on the output shaft through a bearing against axial movement and a follower cam plate connected to the flywheel and adapted to cooperate with the drive cam plate. In addition, the clutch, which is adapted to transmit a driving torque of the output shaft to the flywheel so as to permit overrunning of the flywheel when the wheel is about to become locked, includes a friction clutch plate axially movably connected to the output shaft and opposed to the drive cam plate on the opposite side from the follower cam plate, and a clutch spring for urging the clutch plate into engagement with the drive cam plate.

11 Claims, 16 Drawing Sheets

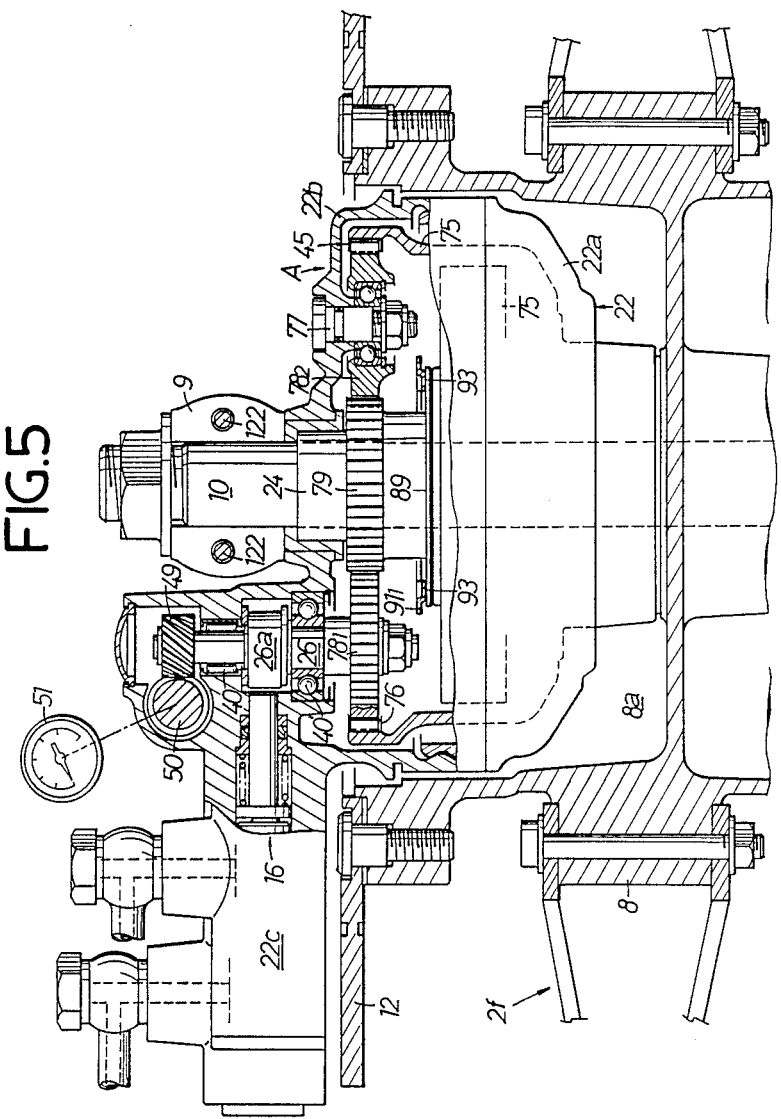

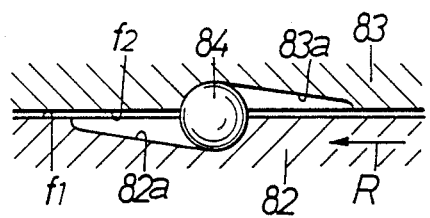
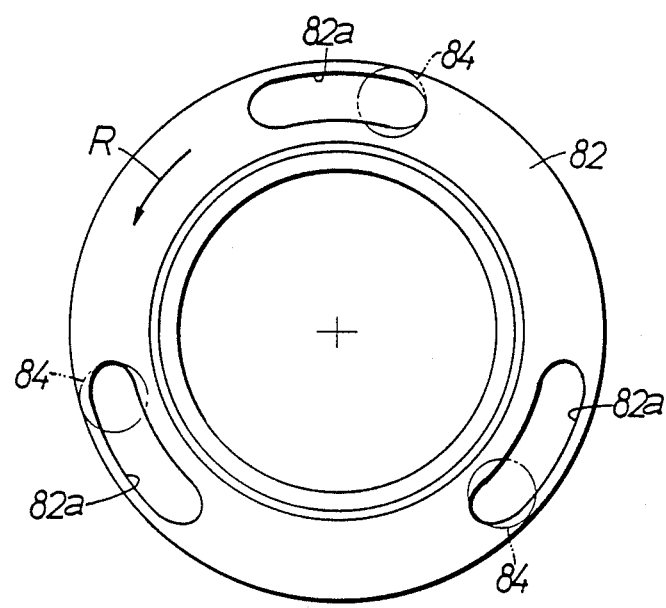

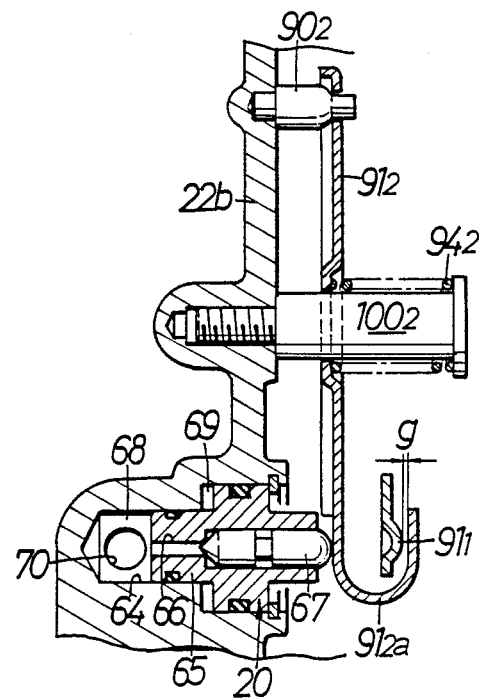

WHEEL ANGULAR ACCELERATION SENSOR FOR ANTI-LOCK CONTROLLER FOR VEHICLES

BACKGROUND OF THE INVENTION

1. Field of the Invention

The present invention relates to a wheel angular acceleration sensor for an anti-lock controller for vehicles and pariticularly, to an improvement of a wheel angular accleration sensor comprising a flywheel rotatably and axially displaceably mounted on an output shaft rotatable in operative connection with a wheel which is braked by a wheel brake; a clutch adapted to transmit a driving torque of the output shaft to the flywheel under a normal operating condition and, when the wheel is about to become locked during braking, to permit overrunning of the flywheel; and a cam mechanism operable in response to the overrunning of the flywheel to provide an axial displacement to the flywheel, the clutch and the cam mechanism being interposed in series between the output shaft and the flywheel, and the axial displacement of the flywheel being output as a control signal for a braking force of the wheel brake.

2. Description of the Prior Art

In such conventional wheel angular acceleration sensor, the cam mechanism comprises a drive cam plate fixedly mounted on the output shaft, and a follower cam plate which is engaged with the drive cam plate and produces an axial displacement as it rotates relatively to the drive cam plate, and a clutch is interposed between the follower cam plate and the flywheel to spring-bias the flywheel toward the drive cam plate (see Japanese Patent Application Laid-open No. 128253/81).

With the above conventional arrangement, if a friction surface of the clutch is worn, the flywheel spring-biased toward the drive cam plate is obliged to axially displace by an amount corresponding to such wearing and hence, the original axial position of the flywheel cannot be stabilized. For this reason, even though the flywheel is axially displaced due to the overrunning thereof, a slight error can be made in the timing at which the axial displacement is picked up as a control signal for the braking force.

SUMMARY OF THE INVENTION

It is therefore an object of the present invention to provide a wheel angular acceleration sensor of the type as described above, in which the above disadvantage is overcome.

To accomplish the above object, a feature of the present invention is in that a cam mechanism comprises a drive cam plate supported on an output shaft through a bearing against axial movement, and a follower cam plate connected to a flywheel and adapted to cooperate with the drive cam plate during overrunning of the flywheel to provide an axial displacement to the flywheel, and in that a clutch comprises a friction clutch plate slidably connected to the output shaft and opposed to the drive cam plate on a side thereof opposite to the follower cam plate, and a clutch spring for urging the friction clutch plate into engagement with the drive cam plate.

With the above construction, it is possible to freely select any set load for the clutch spring in consideration of only a predetermined friction torque between the friction clutch plate and the drive cam plate. Moreover, when the friction clutch plate has been worn, the clutch spring causes only the friction clutch plate to advance toward the drive cam plate, thereby compensating for such wearing. Hence, the flywheel is not axially displaced even due to wearing of the friction clutch plate. Thus, the axial displacement due to overrunning of the flywheel can be properly catched as a control signal for the braking force during braking.

The above and other objects, features and advantages of the invention will become apparent from reading of the following description of the preferred embodiments taken in conjunction with the accompanying drawings.

BRIEF DESCRIPTION OF THE DRAWINGS

The drawings illustrating several embodiments of the present invention will be described in brief.

FIGS. 1 to 8 illustrate a first embodiment of the present invention, wherein

FIG. 1 is a schematic plan view of a motorcycle on which is carried an anti-lock controller including a sensor according to the first embodiment;

FIG. 2 is a side view in longitudinal section of details of the anti-lock controller;

FIG. 3 is a sectional view taken along a line III—III of FIG. 2;

FIG. 4 is an enlarged view in longitudinal section of those portions of the anti-lock controller which are different from the portions shown in FIG. 1;

FIG. 5 is a sectional view taken along a line V—V of FIG. 2;

FIG. 6 is a sectional view taken along a line VI—VI of FIG. 4;

FIG. 7 is a plan view of a drive cam plate in a cam mechanism; and

FIG. 8 is a sectional view taken along a line VIII—VIII of FIG. 2;

FIGS. 9 to 13 illustrate a second embodiment of the present invention, wherein

FIG. 9 is a side view of a rear portion of a motorcycle equipped with an anti-lock controller including a sensor according to the second embodiment;

FIG. 10 is a sectional view taken along a line X—X of FIG. 9;

FIGS. 11 and 12 are enlarged sectional views taken along lines XI—XI and XII—XII of FIG. 10, respectively; and FIG. 13 is a sectional view taken along a line XIII—XIII of FIG. 11; and FIG. 14 to 17 illustrate a third embodiment of the present invention, wherein FIG. 14 is a side view of a rear portion of a motorcycle equipped with an anti-lock controller including a sensor of the third embodiment;

FIG. 15 is a sectional view similar to FIG. 11;

FIG. 16 is a sectional view similar to FIG. 12; and

FIG. 17 is a graph illustrating characteristics of a load response spring and a return spring in a sensitivity adjusting device.

DETAILED DESCRIPTION OF THE PREFERRED EMBODIMENTS

The present invention will now be described by way of several embodiments with reference to the accompanying drawings.

FIGS. 1 to 7 illustrate a first embodiment.

Figure 1:
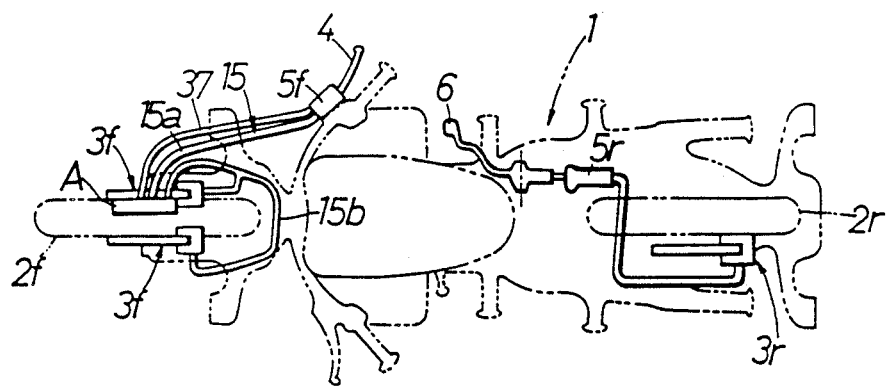

Referring first to FIG. 1, a motorcycle 1 comprises a pair of left and right front wheel brakes 3f, 3f for braking a front wheel 2f, and a rear wheel brake 3r for braking a rear wheel 2r. The both front wheel brakes 3f, 3f are operated by an output hydraulic pressure produced by a front master cylinder 5f operated by a brake lever 4, and the rear wheel brake 3r is operated by a hydraulic pressure produced by a rear master cylinder 5r operated by a brake pedal 6. The hydraulic braking pressure of the front wheel brakes 3f, 3f is controlled by an anti-lock controller A.

Figure 2:
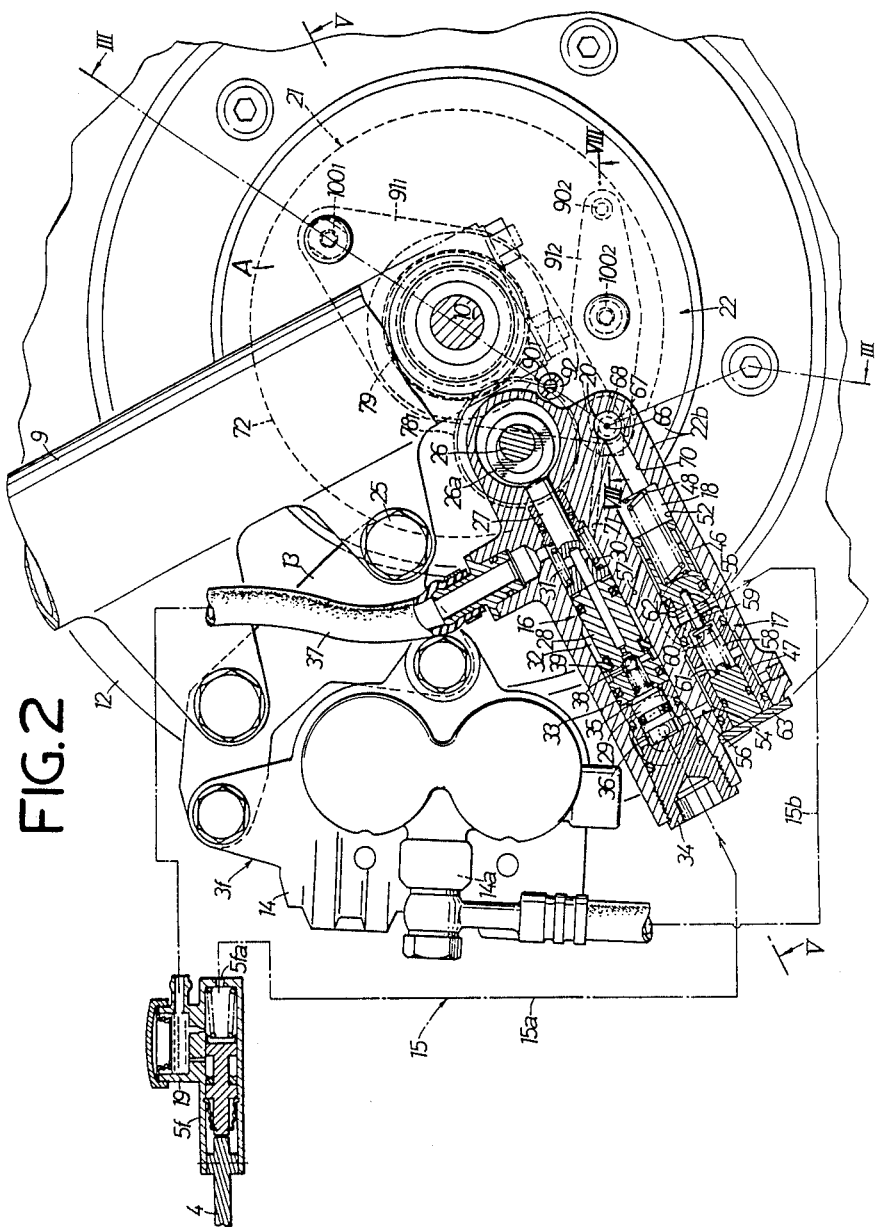
Figure 3:
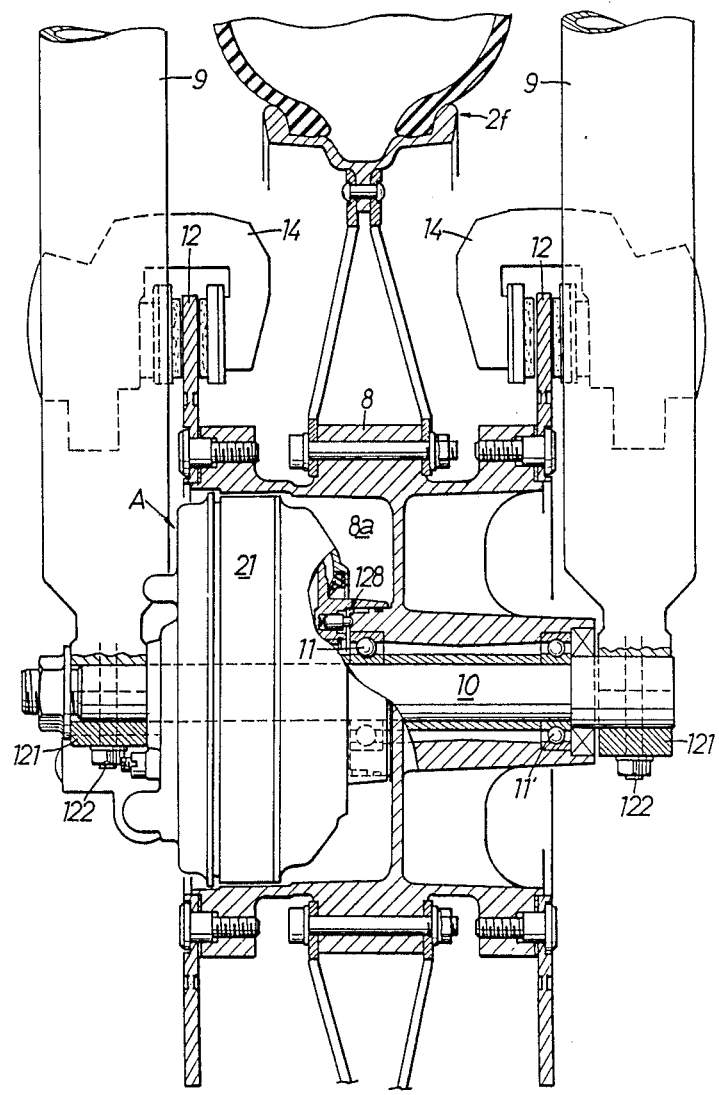

Referring to FIGS. 2 and 3, a hub 8 of the front wheel 2f is rotatably supported on an axle 10 through a pair of bearings 11 and 11'. The axle 10 is removably secured at its opposite ends to lower ends of a pair of left and right front forks 9 by holders 121 and bolt/nut 122. Each of the pair of front wheel brakes 3f, 3f disposed on opposite sides of the front wheel 2f comprises a brake disk 12 secured to an end face of the hub 8 and a brake caliper 14 disposed astride the brake disk 12 and supported on the front fork through a bracket 13. The brake caliper 14, when an output hydraulic oil pressure is supplied to its input port 14a from the front master cylinder 5f, can be operated to clamp the brake disk 12, thereby applying a braking force to the front wheel 2f.

The anti-lock controller A is incorporated in a hydraulic conduit 15 which serves as a braking oil passage connecting an output port 5fa of the front master cylinder 5f with the input port 14a of each of the brake calipers 14.

The anti-lock controller A, as shown in FIGS. 2 to 8, essentially comprises a hydraulic pump 16 operated upon braking, a modulator 17 incorporated on the way of the hydraulic conduit 15 and having a control hydraulic oil chamber 18 into which a pressure discharged from the hydraulic pump 16 is introduced, a normally-closed relief valve 20 interposed in a communication passage between the control hydraulic oil chamber 18 and an oil reservoir 19, and an inertia type wheel angular acceleration sensor 21 for detecting an angular deceleration of the front wheel 2f greater than a given value to open the relief valve 20. All of these components are arranged in a casing 22.

The casing 22 is constructed with open ends of a caplike inner case 22a and an outer case 22b thereof being fitted with each other. The outer case 22b has a radially outwardly extending extension 22c integrally formed at an end wall thereof, and the casing 22, except for its extension 22c, is contained in a recess 8a provided on the left end face of the hub 8. The outer case 22b is supported at a central portion of its end wall on a left end of a cylindrical shaft 24 fitted over an outer periphery of the axle 10, and is also connected to the front fork 9 through detent means against rotation about the axle 10. The detent means may be any means, but for example, a bolt 25 (see FIG. 2) for securing the bracket 13 to the front fork 9 is preferred.

The hydraulic pump 16 comprises a cam shaft 26 disposed in parallel to the axle 10, a push rod 27 disposed with its inner end opposed to an eccentric cam 26a formed on the cam shaft 26, a pump piston 28 abutting against an outer end of the push rod 27, an operating piston 29 which, in turn, abuts against an outer end of the pump piston 28, and a return spring 30 for biasing the push rod 27 away from the eccentric cam 26a.

The push rod 27 and the pump piston 28 are slidably received in a first cylinder bore 33 in the extension 22c to define an inlet chamber 31 and an outlet chamber 32 around their outer peripheries, respectively. A plug 34 is threadedly inserted into an outer end of the first cylinder bore 33 to define a pump chamber 35 between the plug and the pump piston 28, and the operating piston 29 is also slidably received in the outer end of the first cylinder bore 33 to define a hydraulic oil chamber 36 in the plug 34.

The inlet chamber 31 communicates with the oil reservoir 19 through a conduit 37 and also with the pump chamber 35 through a suction valve 38, and in turn, the pump chamber 35 communicates with the outlet chamber 32 through a undirectional sealing member 39 having a discharge valve function. In addition, the hydraulic oil chamber 36 is connected to an upstream pipe 15a of the hydraulic conduit 15 to normally communicate with the output port 5fa of the front master cylinder 5f.

As shown in FIG. 5, the cam shaft 26 is supported on the outer case 22b through bearings 40 and 40' and adapted to be driven from the front wheel 2f through an accelerator 45 which will be described hereinafter.

A meter driving gear 49 is secured to the cam shaft 26 at its outer end and meshed with a driven gear 50 which is coupled to an input shaft of a speed meter 51 for the motorcycle.

Referring again to FIG. 2, the modulator 17 comprises a pressure reducing piston 46, a stationary piston 47 for receiving one end of the pressure reducing piston 46 to define a retreat limit for the latter, and a return spring 48 for biasing the pressure reducing piston 46 in a direction to abut against the stationary piston 47. The two pistons 46 and 47 are slidably received in a second cylinder bore 52 made in the extension 22c adjacent to the first cylinder bore 33.

In the second cylinder bore 52, the pressure reducing piston 46 defines a control hydraulic oil chamber 18 between an inner end wall of the second cylinder bore 52 and also defines an output hydraulic oil chamber 55 between the stationary piston 47 which, in turn, defines an input hydraulic oil chamber 54 around its outer periphery. The input hydraulic oil chamber 54 communicates with the hydraulic oil chamber 36 in the hydraulic pump 16 through an oil passage 56, while the output hydraulic oil chamber 55 is connected to a downstream pipe 15b of the hydraulic conduit 15 to normally communicate with the input port 14a for the front brakes 3f, 3f. The control hydraulic oil chamber 18 communicates with the outlet chamber 32 in the hydraulic pump 16 through an oil passage 57.

The stationary piston 47 includes a valve chamber 58 normally communicating with the input hydraulic oil chamber 54, and a valve bore 59 which permits the valve chamber 58 to communicate with the output hydraulic oil chamber 55. Contained in the valve chamber 58 are a valve member 60 adapted to open and close the valve bore 59, and a valve spring 61 for biasing the valve member 60 toward a valve-closing position. A valve-opening rod 62 for bringing the valve member 60 into a valve-opening position is disposed through the valve bore 59, and when the pressure reducing piston 46 is brought into the retreat limit, the valve-opening rod 62 is urged by the pressure reducing piston 46 to maintain the valve member 60 open.

The second cylinder bore 52 is closed at its outer opening by an end plate 63 secured to the extension 22c, and the stationary piston 47 is maintained at all times in a position to abut against the end plate 63 by a resilient force of the return spring 48 or by hydraulic pressures introduced into the input and output hydraulic oil chambers 54 and 55.

The hydraulic pump 16 and the modulator 17 are disposed behind the front fork 9, as is the brake caliper 14.

Figure 4:
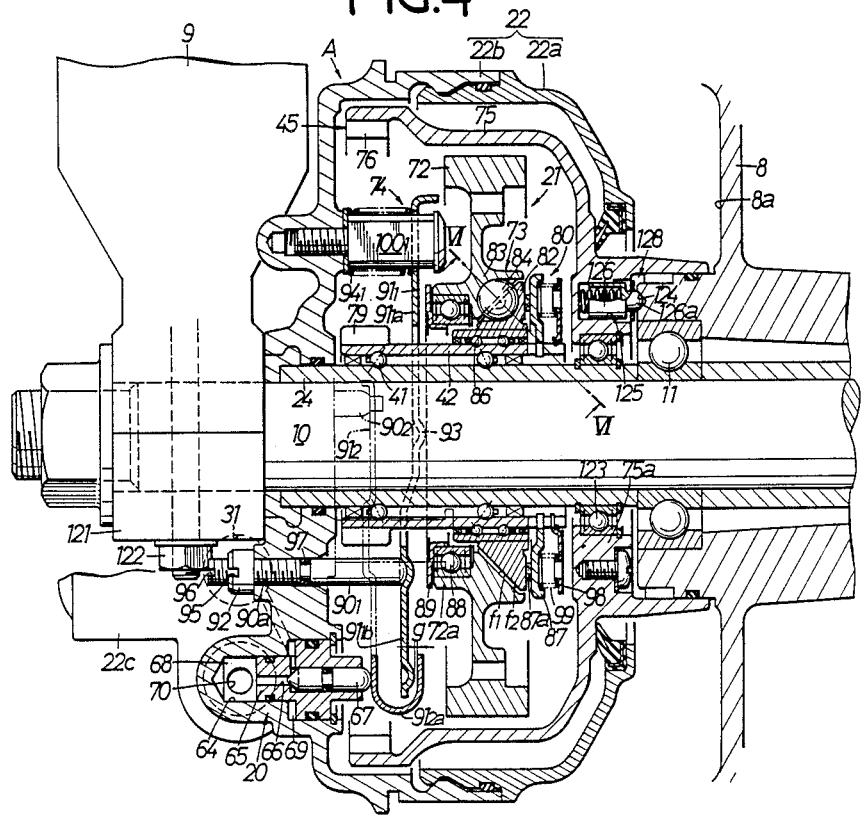

Referring to FIG. 4, the relief valve 20 comprises a seat member 65 fitted in a stepped cylinder bore 64 in the outer case 22b, and a valve member 67 slidably received in the seat member 65 to open and close the valve bore 66. The seat member 65 defines an inlet chamber 68 in a smaller diameter portion of the stepped cylinder bore 64 and also defines an outlet chamber 69 in a larger diameter portion of the cylinder bore 64, the two chambers 68 and 69 being in communication with each other through the valve bore 66. In addition, the inlet chamber 68 communicates with the control hydraulic oil chamber 18 in the modulator 17 through an oil passage 70, while the outlet chamber 69 is in communication with the inlet chamber 31 in the hydraulic pump 16 through an oil passage 71. It follows from the above that the outlet chamber 69 is in communication with the oil reservoir 19.

Referring again to FIG. 4 and also to FIG. 5, the wheel angular acceleration sensor 21 includes a flywheel 72 rotated from the front wheel 2f through the accelerator 45, a clutch 80 which transmits a drive torque from the output shaft 42 to the flywheel 72 and permits overrunning of the flywheel 72 when the front wheel 2f is about to become locked during braking, a cam mechanism 73 which converts the overrunning of the flywheel 72 into an axial displacement, and an output lever mechanism 74 adapted to move in response to the axial displacement of the flywheel 72 to operate the relief valve 20. All of these elements are disposed within the casing 22.

The accelerator 45 is comprised of a cup-like input member 75 disposed within the casing 22 with its open end faced to the outer case 22b, a ring gear 76 formed at the open end of the input member 75, a first planetary gear $78_1$ secured to an inner end of the cam shaft 26 and meshed with the ring gear 76, a single or a plurality of second planetary gears $78_2$ carried through a bearing 111 on a stub shaft 77 mounted in the end wall of the outer case 22 to project therefrom and meshed with the ring gear 76, a sun gear 79 concurrently meshed with the first and second planetary gears $78_1$ and $78_2$, and an output shaft 42 spline-connected to the sun gear 79. The output shaft 42 is supported on the cylindrical shaft 24 through an angular contact bearing 41 against axial movement.

It should be noted that the second planetary gear $78_2$ provides the proper meshing engagement of the first planetary gear $78_1$ with the ring gear 76 and the sun gear 79 to maintain the concentric alignment of the ring gear 76 with the sun gear 79, thus assuring a transmitting effect of the accelerator 45, but if the ring gear 76 and the sun gear 79 have a sufficiently high supporting rigidity, then the second planetary gear may be omitted.

The input member 75 is supported, at a boss 75a centrally formed on its end wall, on the cylindrical shaft 24 through a ball bearing 123 against axial movement. The boss 75a is connected to the hub 8 of the front wheel 2f through an overload clutch 128.

The overload clutch 128 includes a clutch pin 126 slidably received in each of a plurality of support holes 125 (only one of which is shown in FIG. 4) opened in an outer surface of the boss 75a of the input member 75 to surround the center of the boss 75a, and a clutch spring 127 mounted in compression in the support hole 125 for resiliently urging the clutch pin 126 to protrude from the outer surface of the boss 75a. The clutch pin 126 is engaged, at its semispherical leading end 126a, in a tapered clutch hole 124 at an end face of the hub 8. Thus, if a rotational torque larger than a specified value is applied from the hub 8 to the input member 75, the clutch pin 126 can be released from the clutch hole 124 against a set load of the clutch spring 127 to prevent the transmission of an overload.

The flywheel 72 is disposed to surround the output shaft 42 and connected to the output shaft 42 through the cam mechanism 73 and the clutch 80.

Referring to FIGS. 4, 6 and 7, the cam mechanism 73 comprises a drive cam plate 82 carried on the output shaft 42 through an angular contact bearing 86 against axial movement, a follower cam plate 83 integrally formed on the flywheel 72 and opposed to the drive cam plate 82, and a plurality of thrust balls 84, 84 — annularly arranged between both the cam plates 82 and 83.

The drive and follower cam plates 82 and 83 are formed, at their opposed portions, with tapered surfaces $f_1$ and $f_2$ increasing in diameter toward the clutch 80. Each of the tapered surfaces $f_1$ and $f_2$ is provided with a plurality of cam recesses 82a, 83a in which the thrust balls 84, 84— engage.

The recesses 82a of the drive cam plate 82 have their bottoms inclined in such a manner that their depth decreases in a direction R of rotation of the drive shaft 42, while the recesses 83a of the follower cam plate 83 have their bottoms inclined in such a manner that their depth increases in the rotational direction R. Thus, in a normally operated condition where the drive cam plate 82 drives the follower cam plate 83, the thrust ball 84 engages with the deepest portions of the recesses 82a and 83a to merely transmit a rotational torque received by the drive cam plate 82 from the drive shaft 42 to the follower cam plate 83, so that there is no relative rotation between both the cam plates 82 and 83. However, when their positions are reversed, i.e., when the follower cam plate 83 overruns in respect to the drive cam plate 82, a relative rotation occurs between the cam plates 82 and 83, causing the thrust ball 84 to roll up the inclined bottom surfaces of the two cam recesses 82a and 83a. This applies a thrust force to both the cam plates 82 and 83 to axially displace the follower cam plate 82 away from the drive cam plate 82.

As a result of engagement of the thrust ball 84 in the cam recesses 82a and 83a provided on the tapered surfaces $f_1$ and $f_2$ of the drive and follower cam plates 82 and 83 as described above, it is possible for the drive cam plate 82 to support the follower cam plate 83 through the thrust ball 84 in thrust and radial directions, maintaining the flywheel 72 out of contact with the output shaft 42. Therefore, it is not necessary to provide lubrication between the output shaft 42 and the flywheel 72.

The clutch 80 has a friction clutch plate 87 which is annular and which is slidably spline-connected at its inner peripheral edge to the output shaft 42. A lining 87a is deposited to the friction clutch plate 87 and faced to the drive cam plate 82 at the opposite side from the follower cam plate 83. To urge the lining 87a to bring it into engagement with the drive cam plate 82, a clutch spring 99 is mounted in compression between the friction clutch plate 87 and a seat plate 98 locked to an end of the output shaft 42.

The flywheel 72 includes a boss 72a projecting to the opposite side from the cam mechanism 73, and an urging ring 89 for operating the output lever mechanism 74 is mounted around an inner periphery of the boss 72a through an angular contact bearing 88. The urging ring 89 is also disposed out of contact with the output shaft 42.

Referring again to FIG. 4 and also to FIG. 8, the output lever mechanism 74 comprises first and second levers $91_1$ and $91_2$ as primary elements. The first lever $91_1$ is supported, for swinging movement in an axial direction of the axle 10, at a leading end of a first support post $90_1$ projecting out of the inner end face of the outer case 22b at the middle between the axle 10 and the relief valve 20. The first lever $91_1$ includes a longer arm $91_1a$ extending from the first support post $90_1$ to by-pass the output shaft 42, and a shorter arm $91_1b$ extending from the first suppport shaft $90_1$ toward the relief valve 20. At the middle of the longer arm $91_1a$, there are a pair of abutments 93, 93 angularly raised to abut against an outer surface of the urging arm 89. A first control spring $94_1$ is mounted in compression between a leading end of the longer arm $91_1a$ and the outer case 22b to urge the urging ring 89 through the abutments 93. To prevent inclining of the first control spring $94_1$ and sideward oscillation of the first lever $91_1$, a first guide rod $100_1$ is raised on the outer case 22b to pass through the first control spring $94_1$ and the longer arm $91_1a$.

An urging force of the first control spring $94_1$ on the urging ring 89 acts on the drive cam plate 82 through the flywheel 72, the follower cam plate 83 and the thrust ball 84, thereby applying a specified approaching force to the two cam plates 82 and 83.

The second lever $91_2$ is swingably supported at one end thereof on a leading end of a second support post $90_2$ raised on the outer case 22b, with the other end abuting against an outer end of the valve member 67 of the relief valve 20. A central portion of the second lever $91_2$ is passed through a second guide rod $100_2$ raised on the outer case 22b and is biased toward the relief valve 20 by a second control spring $94_2$ locked to a leading end of the guide rod $100_2$. In this way, the second lever $91_2$ normally urges the valve member 67 of the relief valve 20 to maintain it closed.

An end $91_2b$ of the second lever $91_2$ closer to the relief valve 20 is U-shaped to sandwich a leading end of the shorter arm $91_1b$ in a swinging direction thereof, and an end of the shorter arm $91_1b$ is opposed to an inner surface of the U-shaped end $91_2a$ closer to the flywheel 72 with a predetermined clearance g left therebetween.

The first support post $90_1$ is arranged in an adjustable manner so that the clearance g may be properly adjusted. More specifically, the first support post $90_1$ includes a threaded portion 90a screwed in a side wall of the outer case 22b and projecting outwardly therefrom, and a lock nut 92 is screwed over an outer end of the threaded portion 90a. Thus, if the lock nut 92 is loosened and the threaded portion 90a is suitably turned, the effective length of the first support post $90_1$ increases or decreases, so that the first lever $91_1$ can be swung about the abutment 93 to adjust the clearance g. After adjustment, the first support post $90_1$ can be secured to the outer case 22b by tightening the lock nut 92.

The threaded portion 90a and the lock nut 92 are exposed outside the casing 22, so that maintenance may be easily performed by use of a special tool. Specifically, the lock nut 92 is formed into a circular shape and cut at its end face with a tool slot 95 which can be engaged by only a special screwdriver that is not interfered with by the outer end of the threaded portion 90b. A tool slot 96 in the threaded portion 90b may be a usual one which can be engaged by a usual screwdriver.

An O-ring 97 for sealing the outer case 22b is mounted at such a portion of the first support post $90_1$ which passes through the outer case 22b.

Description will now be made of the operation of this embodiment.

When a vehicle is travelling, rotation of the front wheel 2f is transmitted from the hub 8 through the overload clutch 128 to the input member 75, and then to the output shaft 42 while being accelerated by the ring gear 76, the first and second planetary gears $78_1$ and $78_2$ and the sun gear 79, and further through the friction clutch plate 87 and the cam mechanism 73 to the flywheel 72 to drive the latter. Therefore, the flywheel 72 rotates at a speed higher than that of the front wheel 2f. Consequently, it is possible for the flywheel 72 to have a larger rotational inertia.

At this time, even if a rotational vibration of the flywheel 72 is transmitted through the angular contact bearing 88 and the urging ring 89 to the first lever $91_1$, it is absorbed into the clearance g between the first and second levers $91_1$ and $91_2$ and not transmitted to the second lever $91_2$ and the relief valve 20. This makes it possible to avoid a friction of vibration on individual portions of the relief valve 20.

At the same time, the cam shaft 26 and the speed meter 51 are also driven by the rotation of the first planetary gear $78_1$.

Now, if the front master cylinder 5f is operated to brake the front wheel 2f, a hydraulic output pressure from the master cylinder 5f can be transmitted through the upstream pipe 15a of the hydraulic conduit 15, the hydraulic oil chamber 36 in the hydraulic pump 16, the input hydraulic oil chamber 54 in the modulator 17, the valve chamber 58, the valve bore 59, the output hydraulic oil chamber 55 and the downstream pipe 15b of the hydraulic conduit 15 to the front wheel brakes 3f, 3f to operate the latter, thereby applying a braking force to the front wheel 2f.

In the hydraulic pump 16, on the other hand, as the output oil pressure from the front master cylinder 5f is introduced into the hydraulic oil chamber 36, the pump piston 28 is caused to reciprocate under an urging action of such oil pressure on the operating piston 29 and under a lifting action of the eccentric cam 26a on the push rod 27. In a suction stroke where the pump piston 28 moves toward the push rod 27, the suction valve 38 is opened, permitting an oil in the oil reservoir 19 to be drawn from the conduit 37 via the inlet chamber 31 into the pump chamber 35. In a discharge stroke where the pump piston 28 moves toward the operating piston 29, the unidirectional sealing member 39 is opened, permitting the oil in the pump chamber 35 to be pumped into the outlet chamber 32 and further through the oil passage 57 into the control oil chamber 18 in the modulator 17. When the pressure in the outlet chamber 32 and the control oil chamber 18 increases to a predetermined value, the pump piston 28 is maintained, together with the operating piston, in the position to abut against the plug 34.

The control oil chamber 18 in the modulator 17 is initially cut off from communication with the oil reservoir 19 by the closed relief valve 20 and hence, the hydraulic oil pressure supplied from the hydraulic pump 16 to the control oil chamber 18 acts directly on the pressure reducing piston 46 to displace the latter to its retreated position, maintaining the valve member 60 open by the valve-opening rod 62, and permitting the output oil pressure from the front master cylinder 5f to pass therethrough.

Therefore, in a normal braking condition, the braking force applied to the front wheel brakes 3f, 3f is proportional to the output oil pressure from the front master cylinder 5f.

As a given angular deceleration occurs in the front wheel 2f in response to this braking, the flywheel 72 which has sensed such deceleration is intended to be overrun relative to the output shaft 42 by an inertia. In other words, a relative rotation is intended to be caused between both the cam plates 82 and 83. In a stage where there is no possibility of the front wheel 2f being locked, the angular deceleration of the front wheel 2f is lower, so that the relative rotation of the two cam plates 82 and 83 is restricted by the set load of the first control spring $94_1$ which biases the first lever $91_1$ toward the two cam plates 82 and 83.

However, when the front wheel 2f is about to become locked due to an excessive increase in braking force or a decrease in friction coefficient of a road surface, the resultant rapid increase in angular deceleration of the front wheel 2f causes a relative rotation to be produced in the cam plates 82 and 83 by the rotational inertia of the flywheel 72, so that the thrust force produced by rolling of the thrust ball 84 exceeds the set load of the first and second control springs $94_1$ and $94_2$, providing the axial displacement of the follower cam plate 83 and the flywheel 72. This causes the first and second levers $91_1$ and $91_2$ to be successively swung about the first and second support posts $90_1$ and $90_2$ in such a manner to compress the first and second control springs $94_1$ and $94_2$. Thus, the second lever $91_2$ is moved away from the valve member 67 of the relief valve 20 and consequently, the relief valve 20 is opened.

After axial displacement of the flywheel 72, if the rotational torque by the inertia of the flywheel 72 exceeds a specified transmission torque of the friction clutch plate 87, slipping occurs between the drive cam plate 82 and the friction clutch plate 87 to continue overrunning of the flywheel 72 relative to the output shaft 42, and this makes it possible to prevent the cam mechanism 73 and the like from being overloaded.

When the relief valve 20 is opened, the hydraulic oil pressure from the control oil chamber 18 is discharged through the oil passage 70, the inlet chamber 68, the valve bore 66, the outlet chamber 69, the oil passage 71, the inlet chamber 31 in the hydraulic pump 16 and the conduit 37 into the oil reservoir 19. This causes the pressure reducing piston 46 to be moved toward the control oil chamber 18 by the hydraulic oil pressure of the output oil chamber 55 against the force of the return spring 48, thereby retreating the valve-opening rod 62 to close the valve member 60, so that the input and output oil chambers 54 and 55 are cut off from communication with each other, while increasing the volume of the output oil chamber 55. As a result, the hydraulic braking pressure applied to the front brakes 3f is reduced to decrease the braking force on the front wheel 2f and thus, locking of the front wheel 2f is avoided. If so, the rotation of the front wheel 2f accelerates, the thrust force on the first and second levers $91_1$ and $91_2$ by the cam mechanism 73 is released and hence, the first and second levers $91_1$ and $91_2$ are returned to their original positions by the forces of the corresponding first and second control springs $94_1$ and $94_2$ to close the relief valve 20.

When the relief valve 20 is closed, the pressure oil discharged from the hydraulic pump 16 is immediately confined in the control oil chamber 18, and the pressure reducing piston 46 is retreated toward the output oil chamber 55 to increase the pressure in the chamber 55 and recover the braking force. Such operations are rapidly repeated to provide the effective braking of the front wheel 2f.

In the wheel angular deceleration sensor 21, the lining 87a of the friction clutch plate 87 is faced, at the opposite side from the follower cam plate 83, to the drive cam plate 82 supported on the output shaft 42 through the angular contact bearing 86 against axial movement, and the exclusive clutch spring 99 is mounted for urging the friction clutch plate 87 to bring it into engagement with the drive cam plate 82, as described above. Therefore, it is possible to freely select any set load of the clutch spring 99 in consideration of only a predetermined friction torque between the friction clutch plate 87 and the drive cam plate 82. Moreover, when the lining 87a is brought into friction contact, the clutch spring 99 causes only the friction clutch plate 87 to advance toward the drive cam plate 82 to compensate for such friction and hence, the axial displacement of the flywheel 72 cannot be produced at all, leading to no variation in the clearance g between the first and second levers $91_1$ and $91_2$.

In addition, since the first lever $91_1$ for allowing the pair of abutments 93, 93 to abut against the urging ring 89 by the resilient force of the first control spring $94_1$ is opposed to the second lever $91_2$ for closing the relief valve 20 by the resilient force of the second control spring $94_2$ with the clearance g left therebetween, the clearance g can be easily set at an appropriate level. Accordingly, during non-braked operation, the transmission of the rotational vibration of the flywheel 72 to the relief valve 20 can be reliably prevented, while during braking, the relief valve 20 can be properly opened with a minimum suppressed loss of axial displacement of the flywheel 72 to achieve a good antilock control.

FIGS. 9 to 13 illustrate a second embodiment.

In this embodiment, the wheel angular acceleration sensor according to the present invention, unlike the previous embodiment, is used in an anti-lock controller for a rear wheel brake of a motorcycle. However, the structure of the anti-lock controller is substantially similar to that of the previous embodiment, except that the sensitivity of the sensor can be changed. In these Figures, the corresponding parts are designated by the same reference characters.

Figure 9:
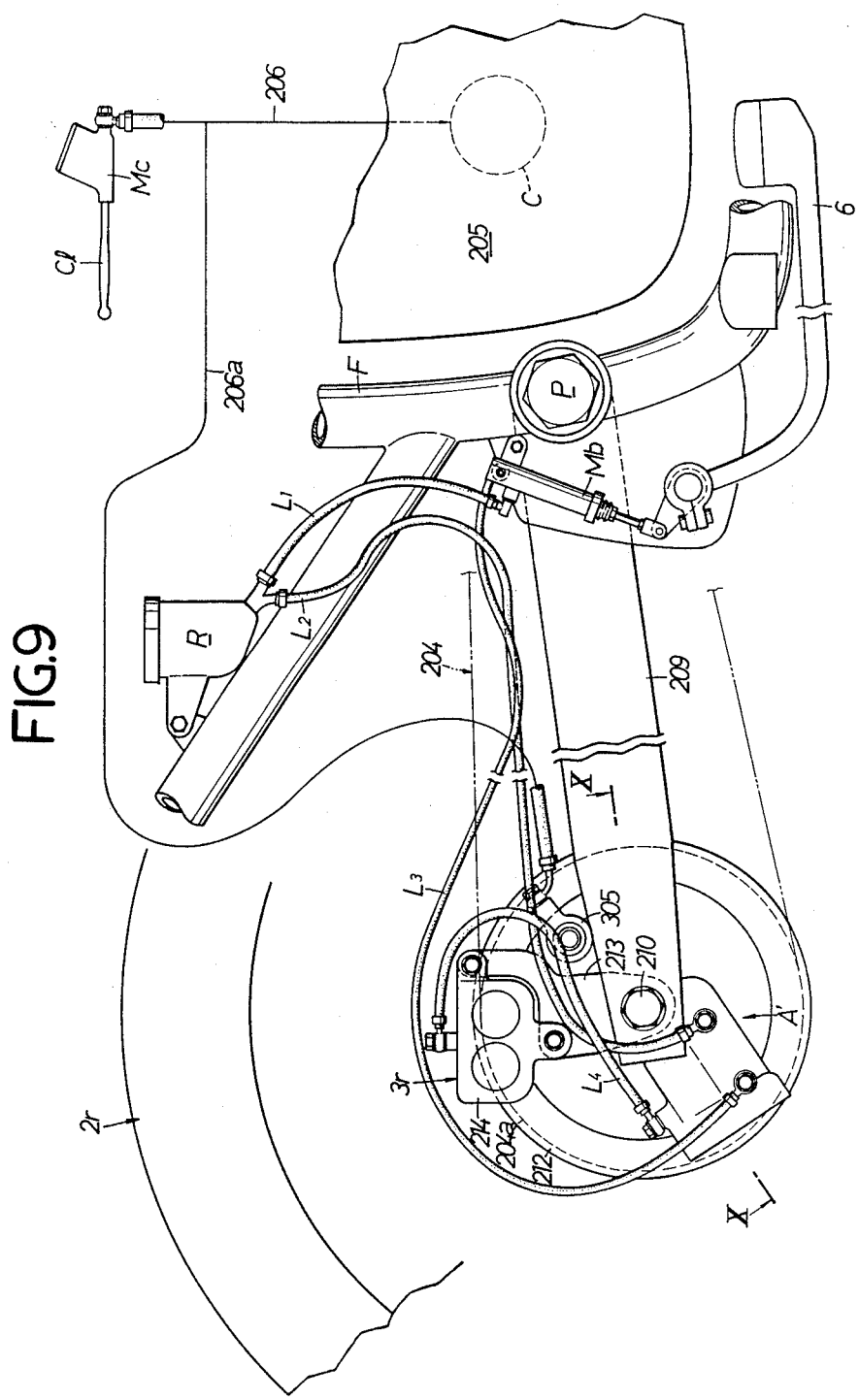

Referring first to FIG. 9, a rear fork 209 for carrying a rear wheel 2r around an axis is vertically swingably connected to a body frame F of the motorcycle via a pivot shaft P, and the rear wheel 2r is driven from an output shaft of a power unit 205 through a chain drive 204. As is conventioanlly normal, the power unit 205 includes an engine and a transmission (both not shown), and further a hydraulic clutch C for connecting and disconnect a transmitting path between both of them.

The clutch C has an input port which is connected through a clutch hydraulic oil conduit 206 to an output port of a clutch master cylinder Mc mounted in a steering handle (not shown). Thus, if the clutch master cylinder Mc is operated by a clutch lever Cl, a hydraulic output pressure from the clutch master cylinder enables the clutch C to be disconnected.

Mounted around an axle 210 of the rear wheel 2r are a disk brake 3r as a rear brake and an anti-lock controller A' for controlling the hydraulic braking pressure for the disk brake 3r. In addition, attached to the body frame F are a brake master cylinder Mb operated by a brake pedal 6 and an oil reservoir R located above the master cylinder Mb.

The oil reservoir R and the brake master cylinder Mb are interconnected through a first supplement oil passage $L_1$, and the brake master cylinder Mb and the anti-lock controller A' are interconnected through an upstream braking-oil passage $L_3$. Further, the anti-lock controller A' and the disk brake 3r are interconnected through a downstream braking-oil passage $L_4$, and the anti-lock controller A' and the oil reservoir R are interconnected through a seond supplement oil passage $L_2$. Thus, a working oil stored in the oil reservoir R is supplemented via the first and second supplement oil passages $L_1$ and $L_2$ into the brake master cylinder Mb and the anti-lock controller A', and an output oil pressure from the brake master cylinder Mb is passed through the upstream braking-oil passage $L_3$, the anti-lock controller A' and the downstream braking-oil passage $L_4$ to the disk brake 3r to act on the latter.

Figure 10:
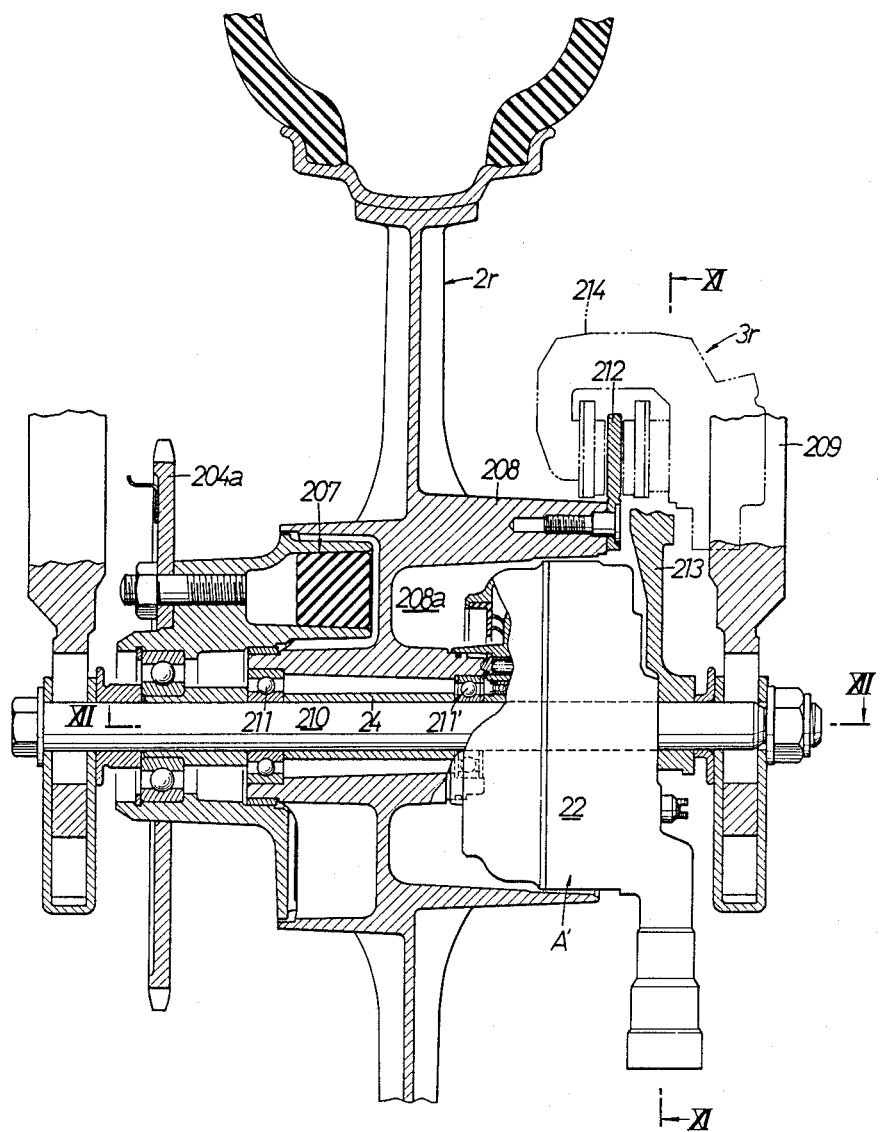

Referring to FIG. 10, the rear wheel 2r has a hub 208 carried through a pair of left and right roller bearings 211 and 211' on the axle 210 which is supported at its opposite ends on the rear fork 209. A driven sprocket 204a of the chain drive 204 is connected to a left end of the hub 208 with an elastomeric fitting 207 interposed therebetween, and a brake disk 212 of the disk brake 3r is secured to a right end of the hub 208. The disk brake 3r has a caliper 214 which is mounted on a bracket 213 supported on the axle 210 and the rear fork 209 and which can be operated upon reception of a hydraulic braking pressure from the anti-lock cxontroller A' to clamp the brake disk 212, thereby applying a braking force to the rear wheel 2r.

Further, the anti-lock controller A' is disposed in a recess 208a provided at a right end face of the hub 208.

Figure 11:
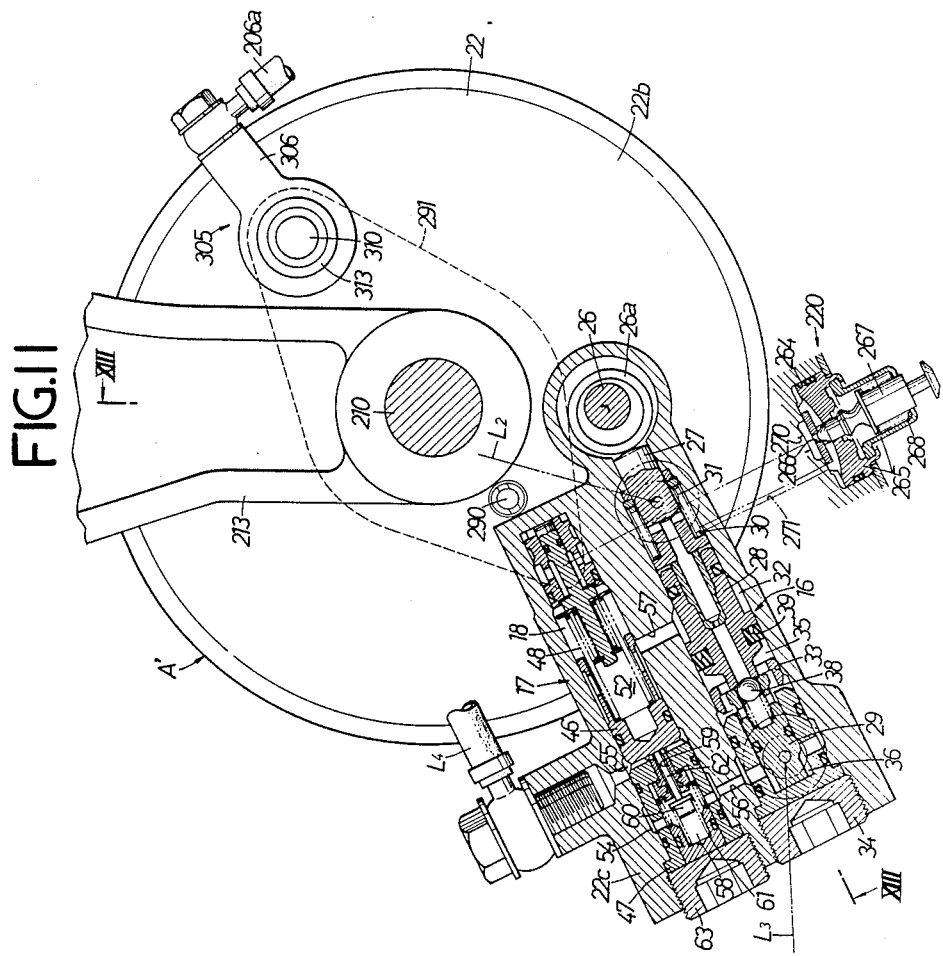

As can be seen for certain by comparison of FIG. 2 with FIG. 11, the modulator 17 and the hydraulic pump 16, in this second embodiment, are disposed within the extension 22c of the vasing 22, so that the modulator 17 is located above the hydraulic pump 16 in the condition that they have been attached to a vehicle body, and this is reverse to the arrangement in the first embodiment illustrated in FIG. 2.

Figure 12:
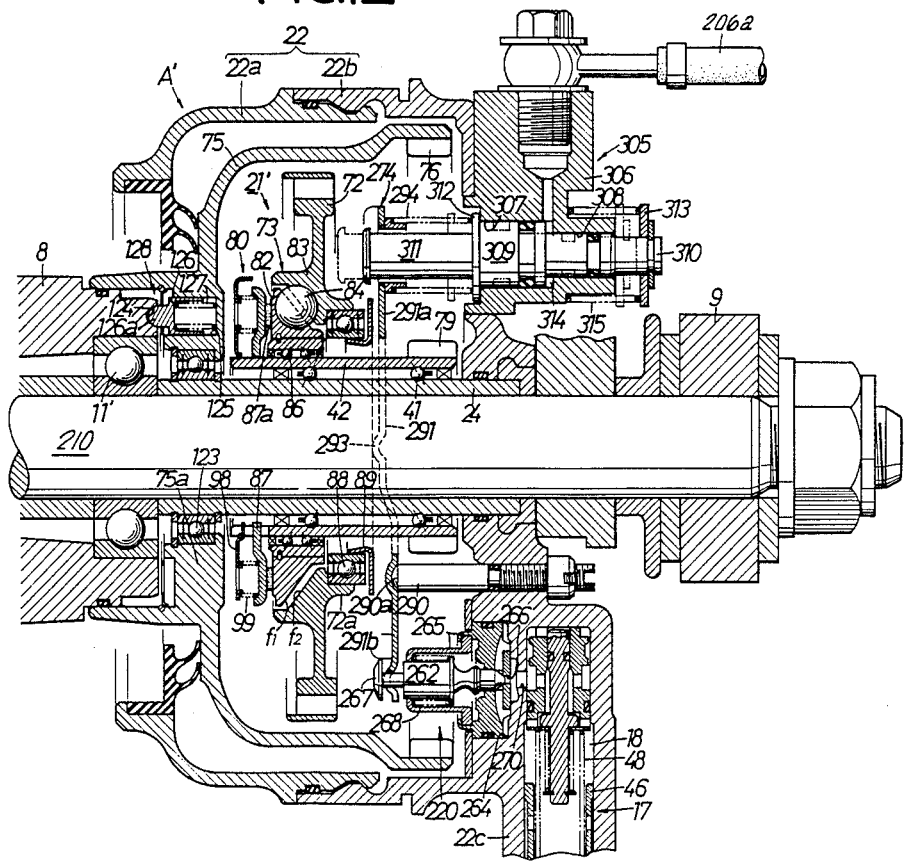

Referring to FIGS. 11 and 12, a relief valve 220 comprises a valve box 265 fitted in a mounting recess 264 in an inner side surface of the outer case 22b, a valve member 267 contained in the valve box 265 to open and close a valve bore 266, and a valve spring 268 for biasing the valve member 267 toward a closed position.

An outer end of the valve bore 266 communicates with the control oil chamber 18 in the modulator 17 via a through hole 270 provided in the outer case 22b, and the interior of the valve box 265 connected to an inner end of the valve bore 266 communicates with the inlet chamber 31 in the hydraulic pump 16 through an oil passage 271. It follows that the interior of the valve box 265 communicates with the oil reservoir R.

A wheel angular acceleration sensor 21', which transmits an angular acceleration produced in the rear wheel 2r and larger than a given value to the relief valve 220, includes an output lever mechanism 274 different from that of the first embodiment.

The output lever mechanism 274 includes a support post 290 mounted in the inner end face of the outer case 22b at the middle between the axle 210 and the relief valve 220 to project therefrom, and a single lever 291 supported on a spherical support point 290a at a leading end of the support post 290 for swinging movement in an axial direction of the axle 210. The lever 291 is comprised of a first longer arm 291a extending from the support post 290 to by-pass the output shaft 42, and a second shorter arm 291b extending from the support post 290 toward the relief valve 220. The first arm 291a is formed at its intermediate portion with an abutment 293 angularly raised to abut against the outer surface of the urging ring 89.

A setting spring 294 is mounted at a leading end of the first arm 291a for resiliently biasing the first arm 291a toward the urging ring 89, and a leading end of the second arm 291b is connected to the valve member 267 of the relief valve 220 with a given backlash or play.

A resilient force of the setting spring 294 on the lever 291 urges the abutment 293 of the first arm 291a against the urging ring 89. With such urging, the valve member 267 of the relief valve 220 is normally released by the lever 291, whereby the relief valve 220 is maintained closed by the valve spring 268. An urging force received from the setting spring 294 by the urging ring 89 acts on the axially fixed drive cam plate 82 through the flywheel 72, the follower cam plate 83 and the thrust ball 84 to support the drive cam plate 82, so that a specified approaching force is applied to the two cam plates 82 and 83.

As shown in FIG. 12, a sensitivity adjuster 305 is connected to the sensor 21' for changing-over and adjust the sensitivity of the sensor 21' at two higher and lower stages in accordance with the connection and disconnection of the clutch C.

The sensitivity adjuster 305 includes a cylinder 306 secured to a side wall of the outer case 22b. The cylinder 306 is provided with a larger diameter cylinder bore 307 opened to an inner surface exposed to the inside of the outer case 22b, and a smaller diameter guide bore 308 coaxial with the cylinder bore 307 and opened to an outer surface. A control piston 309 is slidably received in the cylinder bore 307, and a first piston rod 310 provided on one end face of the control piston to protrude therefrom is slidably received in the guide bore 308 and has its leading end projecting outside.

The control piston 309 is integrally formed with a flange 312 opposed to an inner surface of the cylinder 306, and a fixed end of the setting spring 294 is supported by the flange 312.

A stopper ring 313 is fixedly mounted over the first piston rod 310 and opposed to the outer surface of the cylinder 306, so that alternate abutting of the flange 312 and the stopper ring 313 against the cylinder 306 defines advance and retreat limits (leftward and rightward movement limits in FIG. 12) for the control piston 309. A return spring 315 is compressed between the cylinder 306 and the stopper ring 313 to bias the control piston 309 toward the retreat limit.

A second piston rod 311 is also mounted on the other end, i.e., an inner end of the control piston 309 to protrude therefrom and to pass through the setting spring 294 and the lever 291. This defines a swinging course for the lever 291 and prevents buckling of the setting spring 294.

The control piston 309 defines a hydraulic oil chamber 314 in the cylinder bore 307, and a branch pipe 206a from the clutch oil conduit 206 is connected to an input port of the hydraulic oil chamber 314, so that a hydraulic output pressure from the clutch master cylinder Mc also acts on the hydraulic oil chamber 314.

The operation of the second embodiment during normal braking is the same as that in the previous first embodiment. If the rear wheel 3r is decelerated more than a given value due to an excessive braking force or a reduction in friction coefficient of a travelling road surface, the flywheel 72 of the wheel angular acceleration sensor 21' overruns relative to the output shaft 42 to move the urging ring 89 rightwardly as viewed in FIG. 12. This causes the lever 291 to swing about the support post 290 in such a manner to compress the setting spring 294, thereby moving the valve member 267 of the relief valve 220 leftwardly against the force of the valve spring 268. As a result, the relief valve is opened. This causes the operation of the modulator 17 to avoid locking of the rear wheel 2r as in the first embodiment.

With the clutch C connected, i.e., when the clutch master cylinder Mc is inoperative, the hydraulic oil chamber 314 in the sensitivity adjuster 305 is substantially at atmospheric pressure and hence, the control piston 309 is maintained at the retreat limit at which the forces of the return spring 315 and the setting spring 294 allow the flange 312 to abut against the cylinder 306. Therefore, the setting spring 294 assumes a most extended state with a minimum set load and correspondingly, with a minimum approaching force for the two cam plates 82 and 83.

When braking is effected in such a condition, the cam plates 82 and 83 are relatively rotated at a stage where an angular acceleration generated in the rear wheel 2r is comparatively small. That is, the sensitivity of the sensor 21' is brought into a higher level, so that the suppression of hydraulic braking pressure for the disk brake 3r is comparatively early conducted. Thus, even if an engine brake effect is applied to the rear wheel 2r upon connection of the clutch C, the locking tendency of the rear wheel 2r can be prevented.

On the contrary, with the clutch C disconnected, i.e., when the clutch master cylinder Mc is operative, the output oil pressure therefrom is also applied to the hydraulic oil chamber 314 and hence, the control piston 309 is moved, against the forces of the return spring 315 and the setting spring 294, to the advance limit at which the stopper 313 is forced to abut against the cylinder 306. This causes the setting spring 294 to be compressed by a predetermined amount, so that the set load becomes maximum and the approaching force for the two cam plates 82 and 83 also becomes maximum.

When braking is effected in such a condition, the cam plates 82 and 83 are not relatively rotated unless the angular acceleration generated in the rear wheel increases to a relatively large value. That is, the sensitivity of the sensor 21' is brought into a lower level, so that the suppression of the hydraulic braking pressure for the disk brake 3r is comparatively late conducted.

Thus, the disconnection of the clucth C makes it possible to prevent the idling tendency of the rear wheel 2r which is not subjected to an engine brake effect.

Figure 13:
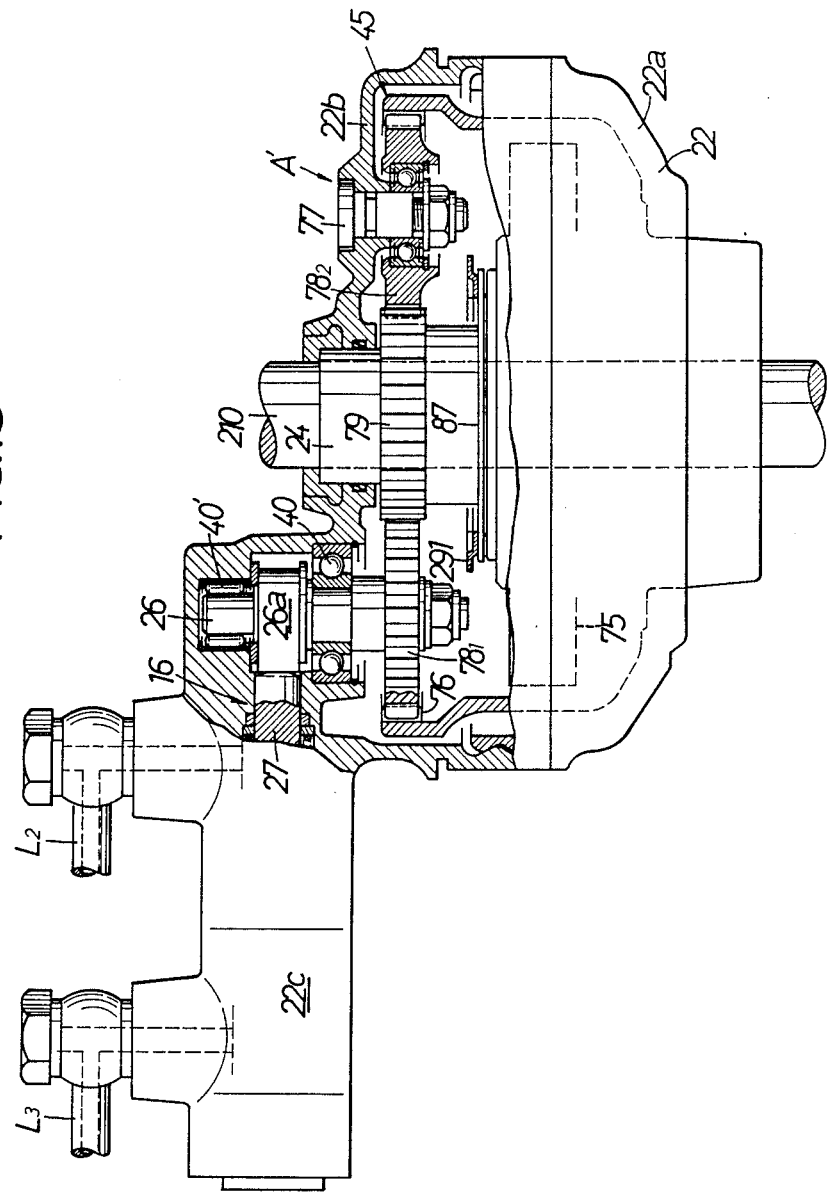

It should be noted that in the second embodiment, the sun gear 79 is integrally formed on the output shaft 42, and the cam shaft 26 of the hydraulic pump 16 is not associated with the speed meter of the motorcycle, as shown in FIG. 13.

FIGS. 14 to 17 illustrate a third embodiment.

In the third embodiment, a wheel angular acceleration sensor according to the present invention is used in an anti-lock controller for a rear brake of a motorcycle as in the second embodiment, and a device for adjusting the sensitivity of the sensor is further added. The parts corresponding to those in the second embodiment are denoted by the same reference characters.

Except for the structure of the sensitivity adjusting device, other structures are indentical with those in the second embodiment and hence, the description thereof is omitted.

A suspension spring (not shown) is incorporated between the body frame F and the rear fork 209, as is conventionally the normal case with the prior art, and in this way, the rear wheel 2r is vertically movably suspended on the body frame F.

The sensitivity adjusting device 405 of this embodiment is arranged to adjust the sensitivity of the wheel acceleration sensor 21".

The sensitivity adjusting device 405 comprises a holder 406 secured to the outer surface of the outer case 22b, a control rod 407 slidably carried on the holder 406 with its inner end passed through the setting spring 294 and the lever 291 in the output lever mechanism 274, and a first bell crank 409 pinned at 408 on the holder 406 to engage a vertical arm 409v with an outer end of the control rod 407.

A first seat plate 411 is secured to the control rod 407 and opposed to an inner surface of the holder 406, whereby a fixed end of the set spring 294 is supported.

A second seat plate 412 is also secured to the control rod 407 and opposed to an outer surface of the holder 406, so that alternate abutting of the first and second seat plates 411 and 412 against the holder 406 defines retreat and advance limits (rightwardly and leftwardly movement limits in FIG. 16) for the control rod 407. A return spring 413 is incorporated in compression between the holder 406 and the second seat plate 412 to bias the control rod 407 toward the retreat limit.

Figure 14:
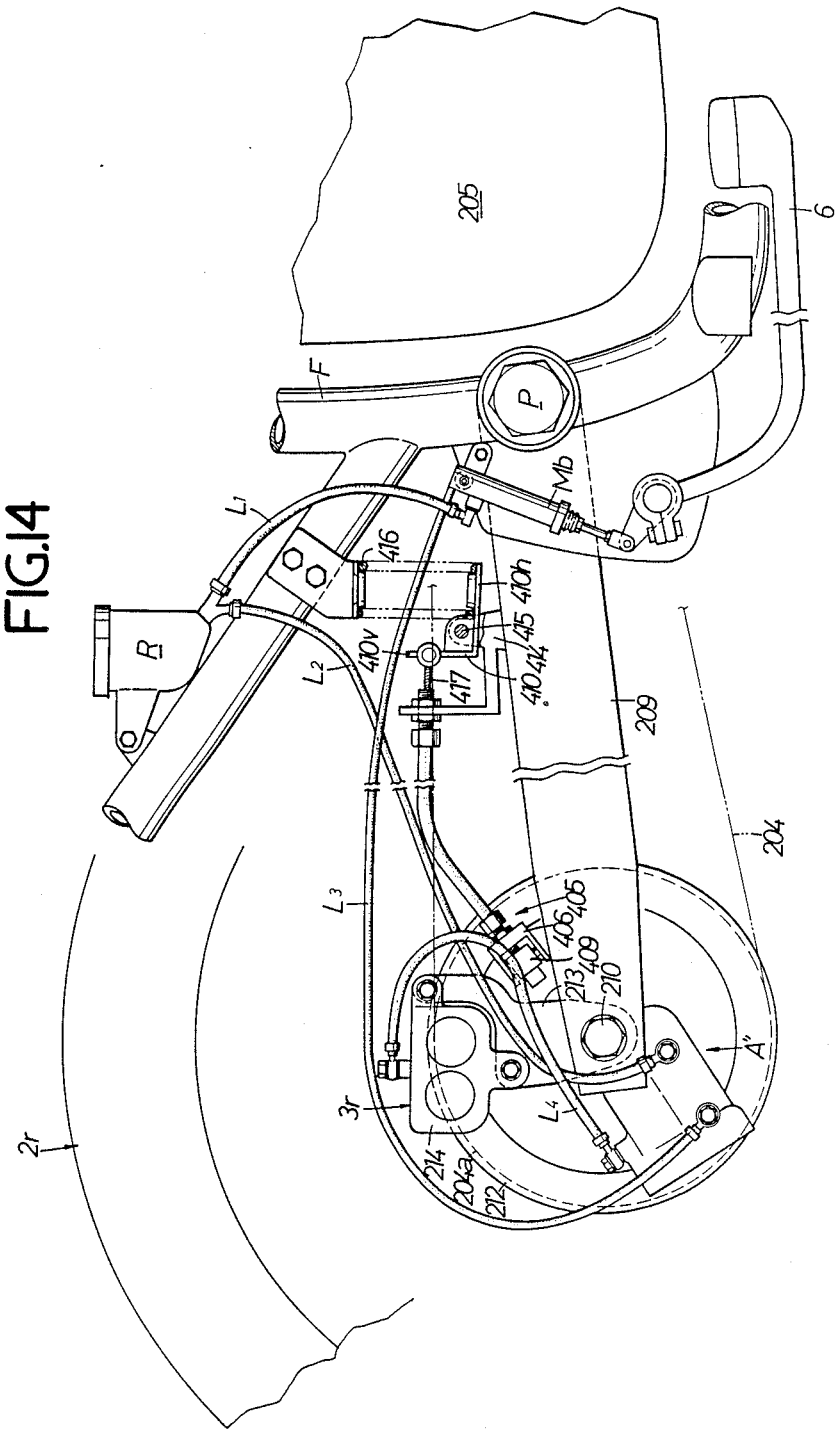
Figure 15:
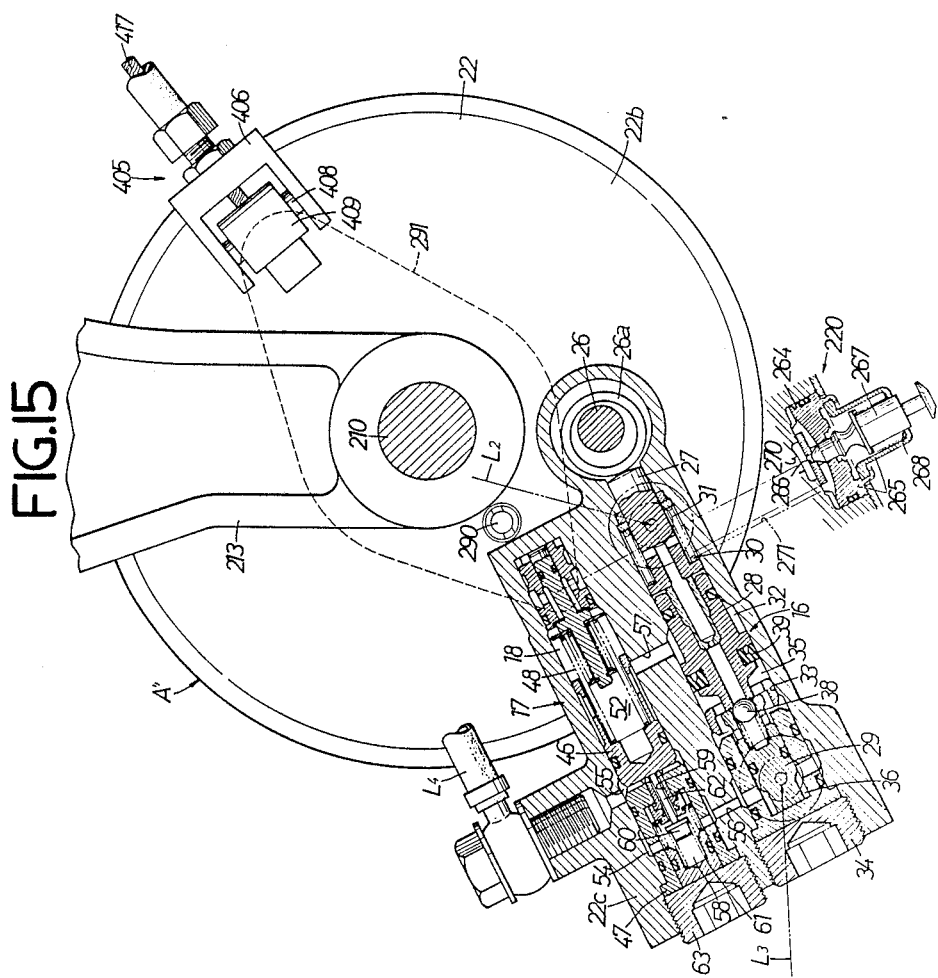
Figure 16:
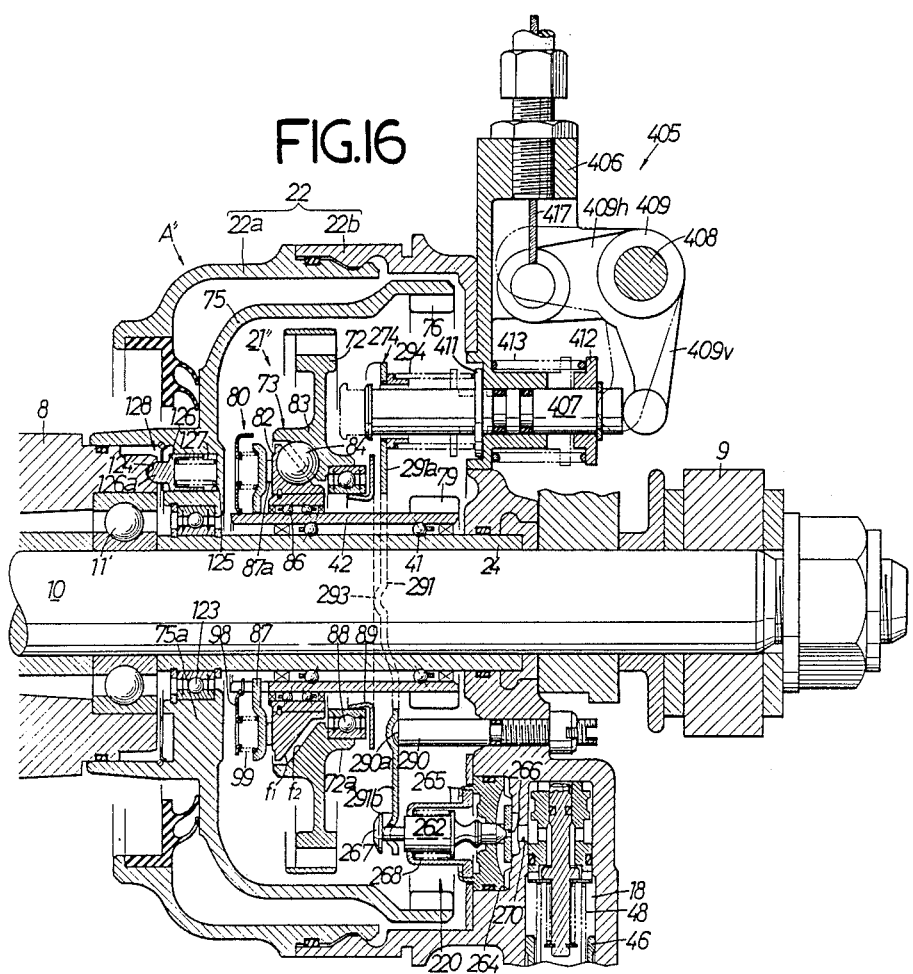

As shown in FIG. 14, the sensitivity adjusting device 405 further includes a bracket 414 secured to an upper surface of the rear fork 209, a second bell crank 410 pinned at 415 on the bracket 414, and a load-responsive spring 416 mounted in compression between a horizontal arm 410h of the second bell crank 410 and the body frame F. The vertical arm 410v of the second bell crank 410 is connected to the horizontal arm 409h of the first bell crank 409 through an interlocking wire 417, so that a resilient force of the load-responsive spring 416 is allowed to act on the return spring 413 in the form of a compressing force.

The load-responsive spring 416 is adapted to be contracted as the rear fork 209 swings upwardly, so that an increase and a decrease in load applied to the rear wheel 2r are revealed in the form of contraction and extension of the load-responsive spring 416.

Figure 17:
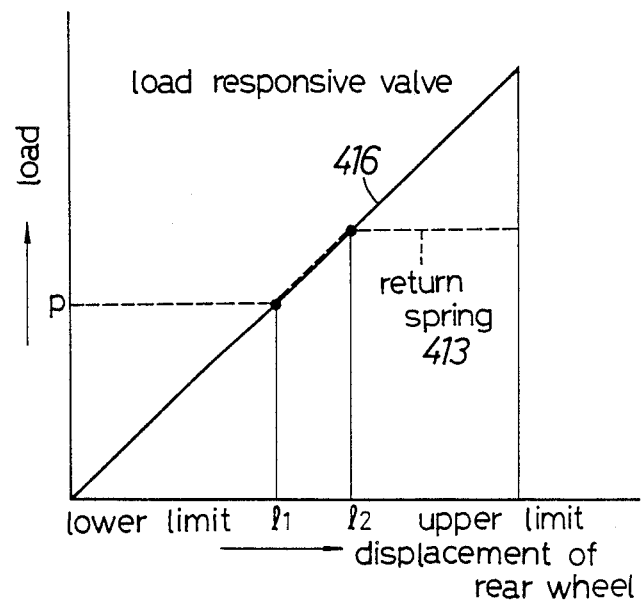

Spring characteristics of the load spring 416 and the return spring 413 are as shown in FIG. 17. Specifically, the return spring 413 has a set load p applied thereto, so that after the amount of contract of the load spring 416 exceeds a value l1, the return spring 413 is contracted with the load-responsive spring 416, and when the amount of contract of the load-responsive spring 416 has reached a value l2 which is larger than the value l1, the contraction of the return spring 413 is completed as result of abutting of the second seat plate 412 against the holder 406.

When the motorcycle is normally travelling, the weights of the body frame F, the power unit 205, a rider and the like are imposed on the front and rear wheels at a given proportion. Such a condition is a highly loaded condition for the rear wheel 2r, wherein the load-responsive spring 416 is contracted more than the value l2, and the return spring 413 is correspondingly contracted to a contraction limit, so that the control rod 407 is maintained at the advance limit. Therefore, the setting spring 294 assumes a most contracted state with a maximum set load and thus, with a maximum approaching force for the two cam plates 82 and 83. Thus, when braking is applied only to the rear wheel 2r in such a condition, the two cam plates 82 and 83 are not relatively rotated unless the angular acceleration generated in the rear wheel 2r increases to a comparatively large value. That is, the sensitivity of the sensor 21'' is brought into the lower level, and the suppression of the hydraulic braking pressure for the disk brake 3r is conducted comparatively late. This makes it possible to prevent the idling tendency of the rear wheel 2r and to effectively utilize a larger friction force between the rear wheel 2r and a road surface for braking.

When rapid braking is applied, for example, to the front and rear wheels of the motorcycle, the load burdened by the front wheel increases, while the load burdened by the rear wheel 2r decreases. In such a lowerly loaded condition of the rear wheel 2r, the load-responsive spring 416 is extended lower than the value l1, and the return spring 413 is extended to an extension limit, so that the control rod 407 is maintained at the retreat limit. Consequently, the setting spring 294 assumes a most extended state with a minimum set load and thus, with a minimum approaching force for the two cam plates 82 and 83. Thus, the cam plates 82 and 83 are relatively rotated at a stage where the angular acceleration generated in the rear wheel 2r is comparatively small. That is, the sensitivity of the sensor 21'' is brought into the higher level, so that the suppression of the hydraulic braking pressure for the disk brake 3r is comparatively early conducted. As a result, the locking tendency of the rear wheel 2r can be prevented even if the friction force between the rear wheel 2r and the road surface decreases due to a decrease in load.

As described above, the drive cam plate of the cam mechanism is supported on the output shaft against axial movement, and the clutch spring of the clutch urges the friction clutch plate into engagement with the drive cam plate on one side in the axial direction of the drive cam plate, while the spring means for applying an approaching force to the drive and follower cam plates of the cam mechanism acts from the other side in the axial direction of the drive cam plate. This makes it possible to set the respective spring forces of these springs at any values in accordance with the individual applications without being affected by each other. In other words, the spring force of the aforesaid spring means which governs the control for opening and closing of the relief valve can be set independent of the spring force of the clutch spring. Moreover, even if the spring force of such spring means is variable, the clutch function cannot be influenced and it is possible to achieve the anti-lock control in accordance with a travelling condition of the vehicle.

What is claimed is:

1. A wheel angular acceleration sensor for an anti-lock controller a wheel of a for vehicle which is braked by a wheel brake, comprising:
    an output shaft rotatble in operative connection with a wheel which is braked by a wheel brake;
    a flywheel rotatably and axially displaceably mounted on said output shaft;
    a clutch disposed between said output shaft and said flywheel and adapted to transmit a driving torque of said output shaft to said flywheel under a normal operating condition and when the wheel is about to become locked during braking, to permit overrunning of said flywheel; and
    a cam mechanism disposed in series with said clutch between said output shaft and said flywheel and operable in response to the overrunning of said flywheel to provide an axial displacement to said flywheel, said axial displacement of said flywheel being output as a control signal for a braking force of the wheel brake;
    said cam mechanism comprising a drive cam plate having opposite sides and supported on said output shaft through a bearing against axial movement, and a follower cam plate connected to said flywheel and adapted to cooperate with said drive cam plate during overrunning of said flywheel to provide the axial displacement to said flywheel, and
    said clutch comprising a friction clutch plate axially movably connected to said output shaft and opposed to said drive cam plate on one side thereof opposite to said follower cam plate, and a clutch spring for urging said clutch plate into engagement with said drive cam plate, wherein a second spring means is provided independent from said clutch spring and urges the follower cam plate into engagement with the drive cam plate on the other side of the drive cam plate so as to determine an approaching force between the drive and follower cam plates in a manner free from the clutch spring.

2. A wheel angular acceleration sensor according to claim 1, further including means for adjusting the biasing force of said second spring means.

3. A wheel angular acceleration sensor according to claim 2, wherein the wheel is driven from an engine through a connectable and disconnectable power transmission system, and the biasing force of said second spring means becomes higher in a connected state of said power transmission system and becomes lower in a disconnected state thereof.

4. A wheel angular acceleration sensor according to claim 2, wherein the wheel is vertically movably suspended on a body of a vehicle, and the biasing force of said second spring means increases as said wheel moves downwardly with respect to said body.

5. A wheel angular acceleration sensor according to claim 1, further including means for adjusting a sensitivity of said angular acceleration sensor by increasing and decreasing the approaching force for the cam plates.

6. A wheel angular acceleration sensor according to claim 1, wherein said bearing for carrying said drive cam plate on said output shaft is an angular contact bearing.

7. A wheel angular acceleration sensor according to claim 1, wherein the biasing forces of said clutch spring and said second spring are supported on said drive cam plate from axially opposite sides thereof, respectively.

8. A wheel angular acceleration sensor for an anti-lock controller for vehicles, comprising:
a flywheel rotatably and axially displaceably mounted on an output shaft rotatable in operative connection with a wheel which is braked by a wheel brake;
a clutch incorporated between said output shaft and said flywheel and adapted to transmit a driving torque of said output shaft to said flywheel under a normal operating condition and when the wheel is about to become locked during braking, to permit overrunning of said flywheel; and
a cam mechanism incorporated in series with said clutch between said output shaft and said flywheel, said cam mechanism comprising a drive cam plate supported on said output shaft, a means for rotating axially independently of said output shaft, and a follower cam plate connected to said flywheel and adapted to cooperate with said drive cam plate during overrunning of said flywheel to provide an axial displacement to said flywheel, said axial displacement of said flywheel being output as a control signal for a braking force of said wheel brake,
said clutch being axially isolated from said cam mechanism, said clutch having a first side axially fixed to said output shaft, a second side comprised of a friction clutch plate being axially moveable adjacent said drive cam plate, and a clutch spring between said clutch plate and said first side of said clutch for urging said clutch plate into engagement with said drive cam plate.

9. A wheel angular acceleration sensor for an anti-lock controller for a wheel of a vehicle which is braked by a wheel brake, comprising:
an output shaft rotatable in operative connection with a wheel which is braked by a wheel brake;
a flywheel rotatably and axially displaceably mounted on said output shaft;
a clutch disposed between said output shaft and said flywheel and adapted to transmit a driving torque of said output shaft to said flywheel under a normal operating condition and when the wheel is about to become locked during braking, to permit overrunning of said flywheel; and
a cam mechanism disposed in series with said clutch between said output shaft and said flywheel and operable in response to the overrunning of said flywheel to provide an axial displacement to said flywheel, said axial displacement of said flywheel being output as a control signal for a braking force of the wheel brake;
said cam mechanism comprising a drive cam plate supported on said output shaft through a bearing against axial movement, and a follower cam plate connected to said flywheel and adapted to cooperate with said drive cam plate during overrunning of said flywheel to provide the axial displacement to said flywheel, and
said clutch comprising a friction clutch plate axially slidably connected to said output shaft and opposed to said drive cam plate on a side of the cam plate opposite to said follower cam plate, and a clutch spring for urging said clutch plate into engagement with said drive cam plate characterized in that an output lever mechanism is provided for feeding the control signal to the anti-lock controller to reduce the braking force in response to the axial displacement of the flywheel exceeding a preset level, the output lever mechanism including a first lever and a second lever which are normally biased toward rest positions thereof by respective control springs, said first and second levers cooperating with each other to move while compressing the respective control springs to generate the control signal when the axial displacement of the flywheel exceeds said present level.

10. A wheel angular acceleration sensor for an anti-lock controller for a wheel of a vehicle which is braked by a wheel brake, comprising:
an output shaft rotatable in operative connection with a wheel which is braked by a wheel brake;
a flywheel rotatably and axially displaceably mounted on said output shaft;
a clutch disposed between said output shaft and said flywheel and adapted to transmit a driving torque of said output shaft to said flywheel under a normal operating condition and when the wheel is about to become locked during braking, to permit overrunning of said flywheel; and
a cam mechanism disposed in series with said clutch between said output shaft and said flywheel and operable in response to the overrunning of said flywheel to provide an axial displacement to said flywheel, said axial displacement of said flywheel being output as a control signal for a braking force of the wheel brake;
said cam mechanism comprising a drive cam plate supported on said output shaft through a bearing against axial movement, and a follower cam plate connected to said flywheel and adapted to cooperate with said drive cam plate during overrunning of said flywheel to provide the axial displacement to said flywheel, and
said clutch comprising a friction clutch plate axially slidably connected to said output shaft and opposed to said drive cam plate on a side of the cam plate opposite to said follower cam plate, and a clutch spring for urging said clutch plate into engagement with said drive cam plate characterized in that an output lever mechanism is provided for feeding the control signal to the anti-lock controller to reduce the braking force in response to the axial displacement of the flywheel exceeding a preset level, said output lever mechanism including a lever normally biased toward a rest position thereof by a spring means which is adapted to apply a variable load onto said lever, said lever being capable of moving while compressing the spring means to generate the control signal when the axial displacement of the flywheel exceeds the preset level, the load of the spring means being variable in response to connection and disconnection of a power transmission system disposed between a power unit and the wheel.

11. A wheel angular acceleration sensor for an anti-lock controller for a wheel of a vehicle which is braked by a wheel brake, comprising:
an output shaft rotatable in operative connection with a wheel which is braked by a wheel brake;
a flywheel rotatably and axially displaceably mounted on said output shaft;
a clutch disposed between said output shaft and said flywheel and adapted to transmit a driving torque of said output shaft to said flywheel under a normal operating condition and when the wheel is about to become locked during braking, to permit overrunning of said flywheel; and a cam mechanism disposed in series with said clutch between said output shaft and said flywheel and operable in response to the overrunning of said flywheel to provide an axial displacement to said flywheel, said axial displacement of said flywheel being output as a control signal for a braking force of said wheel brake;

said cam mechanism comprising a drive cam plate supported on said output shaft through a bearing against axial movement, and a follower cam plate connected to said flywheel and adapted to cooperate with said drive cam plate during overrunning of said flywheel to provide the axial displacement to said flywheel, and said clutch comprising a friction clutch plate axially slidably connected to said output shaft and opposed to said drive cam plate on a side of the cam plate opposite to said follower cam plate, and a clutch spring for urging said clutch plate into engagement with said drive cam plate characterized in that an output lever mechanism is provided for feeding the control signal to the anti-lock controller to reduce the braking force in response to the axial displacement of the flywheel exceeding a preset level, said output lever mechanism including a lever normally biased toward a rest position thereof by a spring means which is adapted to apply a variable load onto the lever, said lever being capable of moving while compressing the spring means to generate the control signal when the axial displacement of the flywheel exceeds the preset level, the load of the spring means being variable in response to movement of the wheel suspended on a vehicle relative to the vehicle.

* * * * *

UNITED STATES PATENT AND TRADEMARK OFFICE
CERTIFICATE OF CORRECTION

PATENT NO. : 4,834,221

DATED : May 30, 1989

INVENTOR(S) : YOSHINORI YAMANOI et al.

It is certified that error appears in the above-identified patent and that said Letters Patent is hereby corrected as shown below:

In the heading of the cover page delete "Yoshinori et al." and insert therefor -- Yamanoi et al. --.

On the cover page after "[75] Inventors:", delete "Yamanoi Yoshinori; Tsuchida Tetsuo" and insert therefor -- Yoshinori Yamanoi; Tetsuo Tsuchida --.

In claim 1, line 2, delete "for".

In claim 1, line 2, after "controller" insert -- for --.

Signed and Sealed this

Twelfth Day of June, 1990

Attest:

HARRY F. MANBECK, JR.

*Attesting Officer*　　　　　*Commissioner of Patents and Trademarks*